US008190363B2

(12) United States Patent
Tomita et al.

(10) Patent No.: US 8,190,363 B2
(45) Date of Patent: May 29, 2012

(54) DRIVING SUPPORT SYSTEM, DRIVING SUPPORT METHOD AND COMPUTER PROGRAM FOR SETTING AND USING FACILITY ENTRY DIFFICULTY LEVELS

(75) Inventors: Hiroshi Tomita, Anjyō (JP); Takahiro Miyachi, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 565 days.

(21) Appl. No.: 12/382,227

(22) Filed: Mar. 11, 2009

(65) Prior Publication Data
US 2009/0248296 A1   Oct. 1, 2009

(30) Foreign Application Priority Data
Mar. 31, 2008   (JP) ................................. 2008-093338

(51) Int. Cl.
*G01C 21/34* (2006.01)
(52) U.S. Cl. ......... 701/424; 701/425; 701/411; 340/935
(58) Field of Classification Search ........................ None
See application file for complete search history.

(56) References Cited

U.S. PATENT DOCUMENTS

| | | | | |
|---|---|---|---|---|
| 5,893,081 A * | 4/1999 | Poppen | ......................... | 705/400 |
| 5,899,955 A * | 5/1999 | Yagyu et al. | ................... | 701/209 |
| 6,216,086 B1 * | 4/2001 | Seymour et al. | ............. | 701/202 |
| 6,577,946 B2 * | 6/2003 | Myr | ............... | 701/117 |
| 6,622,087 B2 * | 9/2003 | Anderson | ..................... | 701/209 |
| 7,171,306 B2 * | 1/2007 | Hirose | ........................... | 701/209 |
| 7,356,407 B2 * | 4/2008 | Johnson et al. | ................ | 701/209 |
| 7,480,566 B2 * | 1/2009 | Laverty | ........................... | 701/209 |
| 7,580,791 B2 * | 8/2009 | Froeberg | ........................ | 701/202 |
| 7,894,980 B2 * | 2/2011 | Liu et al. | ......................... | 701/118 |
| 7,930,096 B2 * | 4/2011 | Kubota et al. | .................. | 701/200 |
| 2004/0015291 A1 * | 1/2004 | Petzold et al. | ................. | 701/202 |
| 2008/0154496 A1 * | 6/2008 | Bucchieri | ...................... | 701/209 |

FOREIGN PATENT DOCUMENTS

| | | |
|---|---|---|
| JP | A-2001-255163 | 9/2001 |
| JP | A-2007-303902 | 11/2007 |
| JP | A-2007-310745 | 11/2007 |
| WO | WO2005108928 | * 11/2005 |
| WO | WO 2007/116650 A1 | 10/2007 |
| WO | WO 2007/122927 A1 | 11/2007 |

OTHER PUBLICATIONS

Aug. 3, 2010 Office Action issued in Japanese Patent Application No. 2008-093338 (with partial translation).

* cited by examiner

*Primary Examiner* — Thomas G. Black
*Assistant Examiner* — Lindsay M Browder
(74) *Attorney, Agent, or Firm* — Oliff & Berridge, PLC

(57) ABSTRACT

When a vehicle enters a facility off a road on which the vehicle is traveling, information pertaining to an entry direction into the facility is sent to a probe center as probe information, and a current driving level of the host vehicle is identified. Meanwhile, the probe center that received the probe information calculates a right-turn entry percentage for facilities based upon the received probe information, and sets an entry difficulty level of the facilities based upon the calculated right-turn entry percentage. A vehicle to which information pertaining to the entry difficulty level of a set facility was distributed from the probe center is structured so as to perform driving support based upon the information pertaining to the entry difficulty level of the facility.

18 Claims, 11 Drawing Sheets

FIG. 3

PROBE INFORMATION

| VEHICLE ID | ENTERED FACILITY ID | ENTRY DATE/TIME | ENTRY DIRECTION |
|---|---|---|---|
| 10012 | 310012 | 2008/3/15 15:02:20 | RIGHT-TURN ENTRY |
| 13672 | 475789 | 2008/3/15 15:03:46 | RIGHT-TURN ENTRY |
| 12876 | 276933 | 2008/3/15 15:04:50 | STRAIGHT ENTRY |
| 12309 | 110032 | 2008/3/15 15:14:23 | LEFT-TURN ENTRY |
| ... | ... | ... | ... |

FIG. 4

DIFFICULTY DETERMINATION TABLE

| ENTRY DIFFICULTY LEVEL | RIGHT-TURN ENTRY PERCENTAGE |
|---|---|
| 5 (HARD) | 0%-10% |
| 4 | 10%-20% |
| 3 | 20%-30% |
| 2 | 30%-40% |
| 1 (EASY) | 40% OR MORE |

FIG.5

ENTRY DIFFICULTY LEVEL INFORMATION

| FACILITY | DAY | TIME PERIOD | ENTRY DIFFICULTY LEVEL |
|---|---|---|---|
| 100001 | MONDAY | ... | ... |
| | | 7:00-8:00 | 3 |
| | | 8:00-9:00 | 2 |
| | | 9:00-10:00 | 1 |
| | | ... | ... |
| | TUESDAY | ... | ... |
| | ... | ... | ... |
| 100002 | ... | ... | ... |
| 100003 | ... | ... | ... |
| 100004 | ... | ... | ... |
| ... | ... | ... | ... |

BEFORE SEARCHING AGAIN

AFTER SEARCHING AGAIN

DRIVING SUPPORT SYSTEM, DRIVING SUPPORT METHOD AND COMPUTER PROGRAM FOR SETTING AND USING FACILITY ENTRY DIFFICULTY LEVELS

INCORPORATION BY REFERENCE

The disclosure of Japanese Patent Application No. 2008-093338 filed on Mar. 31, 2008 including the specification, drawings and abstract is incorporated herein by reference in its entirety.

BACKGROUND OF THE INVENTION

The present invention relates to a driving support system, a driving support method and a computer program which support travel when entering into a facility from a road.

Description of the Related Art

Conventional onboard navigation devices, portable information devices such as personal digital assistants (PDAs) and mobile phones, personal computers and the like can display a map of a desired area for a user by storing facility names and roads such as general roads and expressways as map information in various storage devices, or by downloading such map information from a server or the like.

In addition to displaying a map, to further improve the utility of conventional navigation devices and the like for the user, such devices also have a route search function for searching an optimal route to a destination set by the user. These navigation devices and the like set route guidance based upon a result of the route search. The driver is provided with guidance to a desired destination by displaying the route guidance on a display screen and by performing voice guidance when approaching an intersection, for example.

According to related art, the route search and route guidance are performed in consideration of an entry direction when entering a destination from a road. That is, facilities serving as destinations are built off the roads on which vehicles travel. Therefore, in order for a vehicle traveling on a road to enter a facility, the vehicle must enter by making a right or left turn off the road, as illustrated in FIG. 14. At such time, a driving maneuver to enter the facility is more or less difficult depending on whether the entry is a right-turn entry in which a right turn is made to enter the facility, or a left-turn entry in which a left turn is made to enter the facility.

An example of entry into a facility 103 adjacent to a two-lane road formed from a lane 101 and a lane 102, as shown in FIG. 14, will be explained below. A vehicle 104 traveling in the lane 101 must cross over the lane 102 where oncoming vehicles travel in order to enter the facility 103. However, a vehicle 105 traveling in the lane 102 does not need to cross the other lane in order to enter the facility 103. In other words, in Japan where vehicles drive on the left-hand side of roads, the left-turn entry into a facility is less difficult than the right-turn entry into a facility. Accordingly, for a driver with a low level of driving skill, guidance that provides a route where the destination is entered by making a left turn is desirable, rather than providing a route where the destination is entered by making a right turn. Also, in cases where the destination is adjacent to a road with a large traffic volume that makes crossing a lane difficult, guidance providing a route where the destination is entered by making a left turn is desirable, rather than providing a route where the destination is entered by making a right turn.

Hence, Japanese Patent Application Publication No. JP-A-2001-255163 (pages 3 and 4, FIGS. 3 to 5) for example, describes art wherein for a shortest route to a destination that requires a right-turn entry into the destination, it is determined whether providing a right-turn entry route to a user is appropriate based upon congestion information, a link cost, a number of lanes, regulation information and the like regarding a road adjacent to the destination. If such a route is determined inappropriate, then instead of the shortest route, a guidance route is set to a route with a left-turn entry into the destination.

SUMMARY OF THE INVENTION

Here, according to the art described in Japanese Patent Application Publication No. JP-A-2001-255163 (pages 3 and 4, FIGS. 3 to 5), whether or not a right-turn entry into a destination is difficult is estimated based upon road information (such as the existence of congestion, the link cost, the number of lanes, and regulation information) regarding the road adjacent to the destination. However, the difficulty of an actual right-turn entry cannot be accurately determined based upon the road conditions alone. According to the art described in Japanese Patent Application Publication No. JP-A-2001-255163 (pages 3 and 4, FIGS. 3 to 5) for example, a right-turn entry into a destination was determined difficult if the road had many lanes; however, there are cases where, even for a road with many lanes, a right-turn entry into a destination is easy if the road has a low traffic volume.

The present invention was devised in order to resolve the above issue with related art, and it is an object of the present invention to provide a driving support system, a driving support method and a computer program, which are capable of setting a difficulty level of entry into a facility based upon a result of an actual vehicle's entry into the facility so as to accurately set the difficulty level of entry into the facility.

According to a driving support system of a first aspect of the present invention, an entry difficulty level for a facility is set based upon the results of actual vehicles entering into the facility. Therefore, an accurate entry difficulty level can be set for the facility. By providing a user with the set entry difficulty level of a facility, driving support in line with the user's driving skill can be achieved.

According to a driving support system of a second aspect of the present invention, since the entry difficulty level of the facility is set per date/time, the entry difficulty level of the facility can be set in consideration of a change in traffic volume on a road adjacent to the facility, and the like. Therefore, the entry difficulty level of the facility can be more accurately set in accordance with the day and time period.

According to a driving support system of a third aspect of the present invention, a higher entry difficulty level is set for a facility with a greater number of left-turn entries. Therefore, the entry difficulty level of the facility can be accurately set based upon the results of actual vehicles entering into the facility.

According to a driving support system of a fourth aspect of the present invention, by taking into consideration the entry difficulty level of the facility and a driving level of the vehicle, driving support in line with the vehicle's driving level can be achieved. Therefore, appropriate driving support can be performed both for a user with a high level of driving skill and a user with a low level of driving skill.

According to a driving support system of a fifth aspect of the present invention, it is possible for a vehicle with a low driving level to arrive at the destination via a route with an easy entry into the destination.

According to a driving support system of a sixth aspect of the present invention, since the entry difficulty level of the facility is set per date/time, the entry difficulty level of the destination at the estimated time of arrival can be obtained. Therefore, based upon a more accurate entry difficulty level for the destination, it is possible for a vehicle to arrive at the destination via a route with an easy entry into the destination.

According to a driving support method of a seventh aspect of the present invention, an entry difficulty level for a facility is set based upon the results of actual vehicles entering into the facility. Therefore, an accurate entry difficulty level can be set for the facility. By providing a user with the set entry difficulty level of a facility, driving support in line with the user's driving skill can be achieved.

According to a computer program of an eighth aspect of the present invention, a computer sets an entry difficulty level for a facility based upon the results of actual vehicles entering into the facility. Therefore, an accurate entry difficulty level can be set for the facility. By providing a user with the set entry difficulty level of a facility, driving support in line with the user's driving skill can be achieved.

BRIEF DESCRIPTION OF THE DRAWINGS

FIG. 3 is a drawing that shows an example of a storage area of a probe information database;

FIG. 4 is a drawing that shows a difficulty determination table;

FIG. 5 is a drawing that shows an example of a storage area of an entry difficulty level information database;

DETAILED DESCRIPTION OF THE EMBODIMENT

A specific embodiment of a driving support system according to the present invention will be explained in detail below with reference to the drawings.

Figure 1:
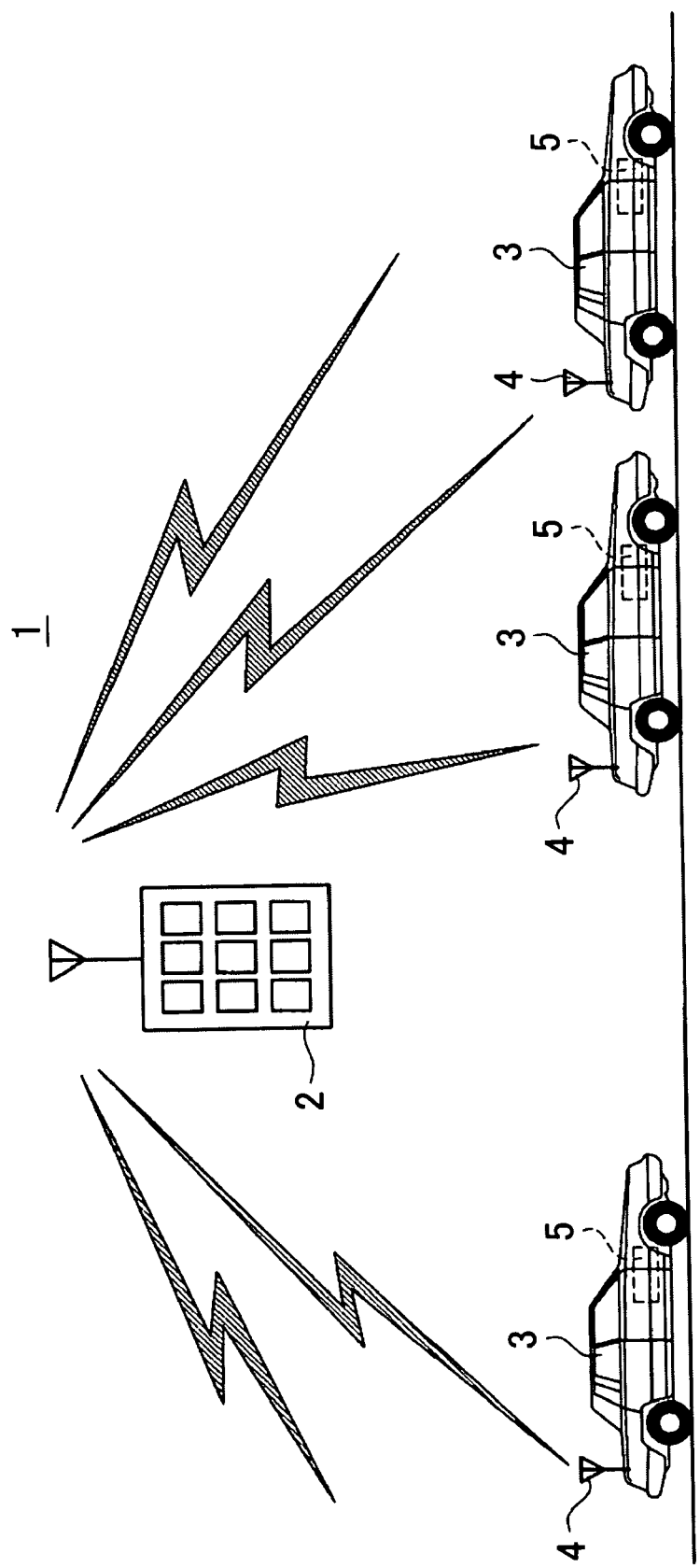
FIG. 1 is a schematic structural drawing that shows a driving support system according to an embodiment.

A schematic configuration of a driving support system 1 according to the present embodiment will be explained first using FIG. 1. FIG. 1 is a schematic structural drawing that shows the driving support system 1 according to the present embodiment.

As FIG. 1 illustrates, the driving support system 1 according to the present embodiment is basically structured from a probe center 2, which collects probe information and creates/distributes traffic information based upon the collected probe information; and a vehicle 3, which is a probe car.

Here, the probe center 2 is an information distribution center that collects and accumulates probe information including an entry direction into a facility and the like, which is sent from respective vehicles 3 traveling throughout the country. The probe center 2 also sets an entry difficulty level for each facility by performing statistical processing of the accumulated probe information, and distributes information pertaining to the set entry difficulty level (referred to as entry difficulty level information below) to the vehicle 3.

Figure 14:
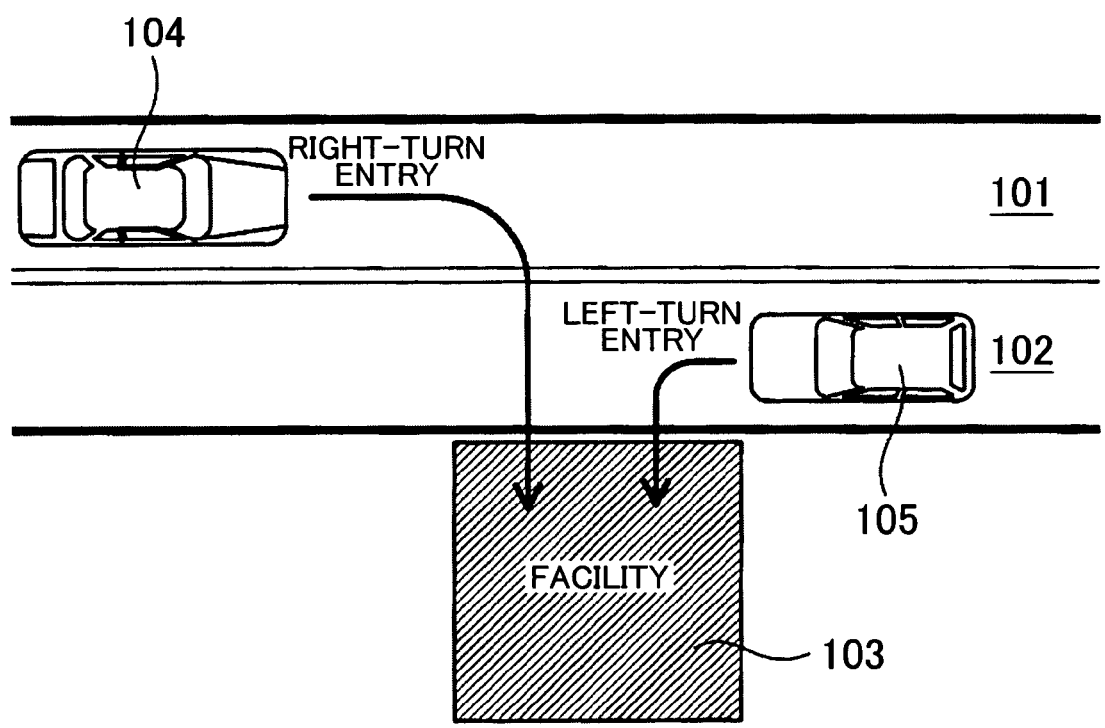
FIG. 14 is a drawing for explaining a right-turn entry and a left-turn entry into a facility.

Here, the travel direction into the facility indicates a travel direction of the vehicle 3 when entering from a road on which the vehicle 3 is traveling into the facility off the road. The travel direction is divided into the following: a right-turn entry, wherein the vehicle enters into the facility by making a right turn; a left-turn entry, wherein the vehicle enters into the facility by making a left turn; and a straight entry, wherein the vehicle enters into the facility by proceeding straight with respect to the facility, which is situated at a T-shaped road or the like (see FIG. 14).

In addition, the entry difficulty level defines a level of vehicle driving difficulty when entering from a road the vehicle is traveling into a facility off the road using five levels ranging from 1 (easy) to 5 (hard). As explained later, the entry difficulty level is set based upon a percentage of vehicles 3 performing a right-turn entry in the past to enter the facility.

The vehicle 3 is a vehicle that travels on roads throughout the country, and together with the probe center 2 structures a probe car system as a probe car. Here, the probe car system is a system that collects information using a vehicle as a sensor. Specifically, in addition to speed data, the vehicle sends the operation status of various systems such as a steering operation and shift position along with position information of a GPS 41 to the probe center 2 via an onboard communication module 4 (referred to simply as a communication module 4 below), which is a mobile phone or the like mounted in the vehicle in advance. On the center side, such collected data is utilized as diverse information.

Here, in the driving support system 1 according to the present embodiment, the probe information obtained by the vehicle 3 and sent to the probe center 2 especially includes information pertaining to the entry direction when the vehicle 3 entered a facility (whether a right-turn entry, a left-turn entry, or a straight entry). Based upon the respective information sent from the vehicle 3, the probe center 2 sets the entry difficulty level of facilities included in the map information.

A navigation device 5 is installed in the vehicle 3. The navigation device 5 is an onboard device that displays a map around a host vehicle position based upon stored map data, and performs a route search and guidance to a set destination. Additionally, the navigation device 5 performs a route search to a destination based upon the entry difficulty level information of facilities received from the probe center 2, and also performs guidance regarding VICS information received from a VICS center (not shown) for a user. A configuration of the navigation device 5 will be described in more detail later.

Figure 2:
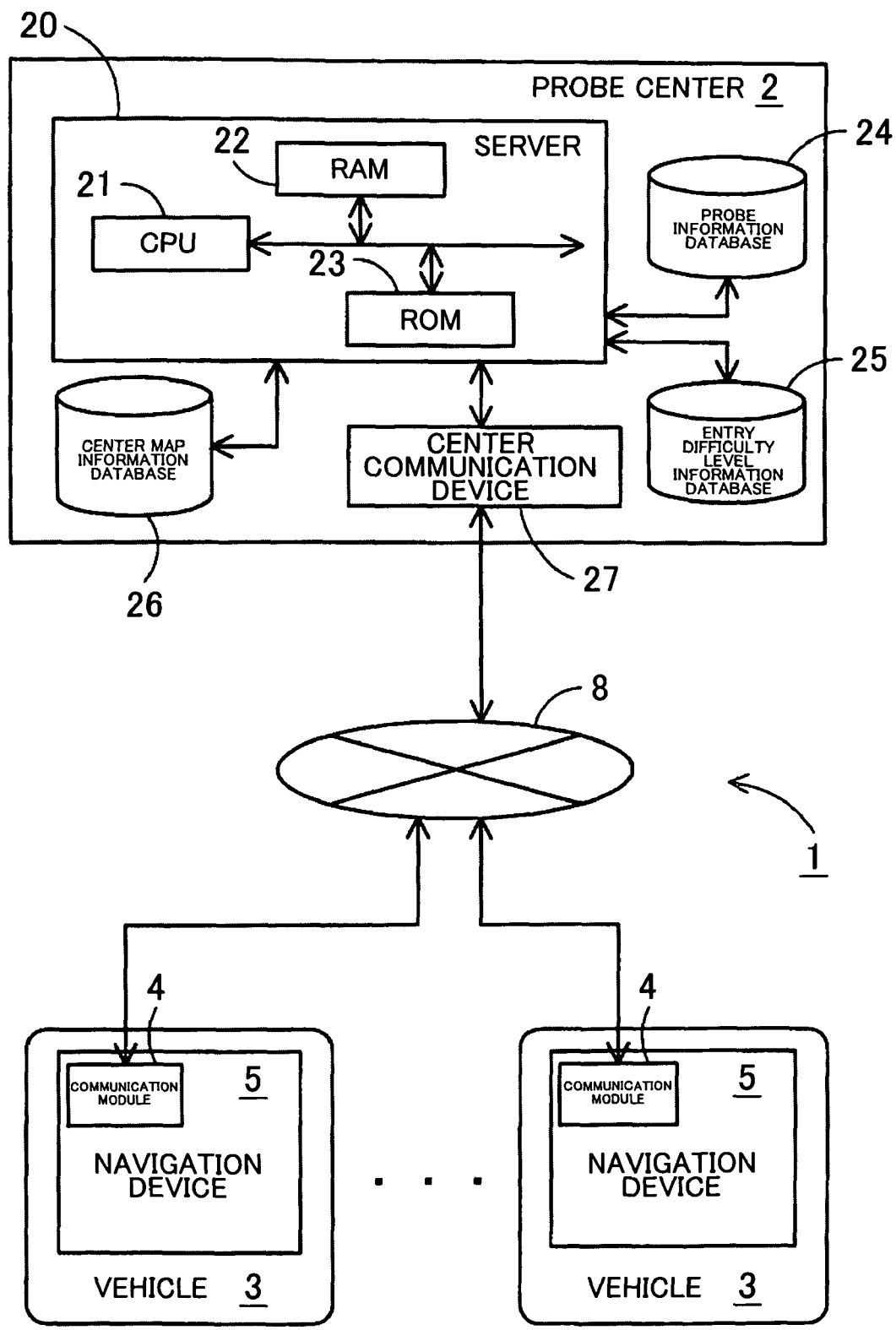
FIG. 2 is a block diagram that shows a configuration of the driving support system according to the present embodiment.

Next, a configuration of the probe center 2 structuring the driving support system 1 will be described in detail using FIG. 2. FIG. 2 is a block diagram that shows a configuration of the driving support system 1 according to the present embodiment.

As shown in FIG. 2, the probe center 2 includes a server (an entry direction obtaining unit, a percentage calculating unit, and an entry difficulty level calculating unit) 20, a probe information database 24, an entry difficulty level information database 25, and a center map information database 26, which serve as information storage units connected with the server 20, and a center communication device 27.

The server 20 is a control unit that performs various controls in the probe center 2, such as probe information receiving processing for collecting the probe information from the vehicles 3, entry difficulty level setting processing for setting the entry difficulty level of facilities based upon the accumulated probe information, and information distribution processing for distributing to the vehicle 3 information pertaining to the set entry difficulty level of a facility. Also provided are a CPU 21 serving as a computational device and a control device that performs an overall control of the server 20, as well as internal memory devices such as a RAM 22 that is used as a working memory when the CPU 21 performs various computational processing; and a ROM 23 in which various control programs are stored, in addition to a probe information receiving processing program (FIG. 8), an entry difficulty level setting processing program (FIG. 9), an information distribution processing program (FIG. 10), and a difficulty determination table (FIG. 4), which are described later.

The probe information database 24 is a storage unit that cumulatively stores the probe information collected from the vehicles 3 traveling throughout the country. Note that in the present embodiment, the probe information collected from the vehicle 3 especially includes information pertaining to the entry direction into a facility when the vehicles 3 enter from a road on which the vehicles 3 are traveling into the facility off the road.

The probe information stored in the probe information database 24 will be described in detail below using FIG. 3. FIG. 3 is a drawing that shows an example of the probe information stored in the probe information database 24.

The probe information shown in FIG. 3 is structured from a vehicle ID that identifies the vehicle from which the probe information was sent, a facility ID that identifies the facility into which the vehicle entered, a date/time at which the vehicle entered the facility, and an entry direction in which the vehicle entered the facility. For example, the probe information shown in FIG. 3 stores that a vehicle whose ID is 10012 performed a right-turn entry to enter into a facility whose ID is 310012 at 15:02:20 on Mar. 15, 2008. The probe information also stores that a vehicle whose ID is 13672 performed a right-turn entry to enter into a facility whose ID is 475789 at 15:03:46 on Mar. 15, 2008. The probe information further stores that a vehicle whose ID is 12876 performed a straight entry to enter into a facility whose ID is 276933 at 15:04:50 on Mar. 15, 2008. The probe information still further stores that a vehicle whose ID is 12309 performed a left-entry to enter into a facility whose ID is 110032 at 15:14:23 on Mar. 15, 2008.

The server 20 extracts the probe information indicating entry into the same facility for every entry date/time the facility was entered from among the probe information stored in the probe information database 24, and calculates the percentage of right-turn entry into each facility for every date/time. Based upon the difficulty determination table stored in the ROM 23 and the calculated percentage of right-turn entry, the entry difficulty level of the facility is set per date/time.

The difficulty determination table stored in the ROM 23 will be explained in detail here using FIG. 4. FIG. 4 is a drawing that shows the difficulty determination table stored in the ROM 23.

As shown in FIG. 4, the difficulty determination table is structured from percentages of right-turn entry and difficulty levels that correspond to the percentages of right-turn entry.

Note that the right-turn entry percentage is a value indicating an approximate ratio of vehicles that entered by a right-turn entry among past vehicles that entered the facility which is the target of the difficulty determination. The right-turn entry percentage is calculated according to Formula (1) below.

Right-turn entry percentage=quantity of probe information wherein right-turn entry was made into difficulty determination-targeted facility/quantity of probe information wherein entry was made into difficulty determination-targeted facility    (1)

According to the present embodiment, if the right-turn entry percentage of a facility whose entry difficulty level is targeted for determination is 0% to under 10%, as shown in FIG. 4, then the entry difficulty level of the facility is determined as 5. If the right-turn entry percentage of the facility whose entry difficulty level is targeted for determination is 10% to under 20%, then the entry difficulty level of the facility is determined as 4. If the right-turn entry percentage of the facility whose entry difficulty level is targeted for determination is 20% to under 30%, then the entry difficulty level of the facility is determined as 3. If the right-turn entry percentage of the facility whose entry difficulty level is targeted for determination is 30% to under 40%, then the entry difficulty level of the facility is determined as 2. If the right-turn entry percentage of the facility whose entry difficulty level is targeted for determination is 40% or more, then the entry difficulty level of the facility is determined as 1. In other words, a lower right-turn entry percentage is accompanied by the determination of a higher entry difficulty level for the facility.

Meanwhile, the entry difficulty level information database 25 is a storage unit that stores information pertaining to the entry difficulty level of facilities for each date/time set by the server 20. In the present embodiment, the information pertaining to the entry difficulty level of a facility is generated based upon statistical processing of the probe information stored in the probe information database 24 as described later.

Here, the information pertaining to the entry difficulty level of a facility includes a facility ID identifying the facility and an entry difficulty level per date/time.

Information pertaining to the entry difficulty level of a facility stored in the entry difficulty level information database 25 will be described in detail below using FIG. 5. FIG. 5 is a drawing that shows an example of the information pertaining to the entry difficulty level of a facility stored in the entry difficulty level information database 25.

As shown in FIG. 5, the information pertaining to the entry difficulty level of a facility is structured from a facility ID identifying the facility, a day and time period, and an entry difficulty level set per day and time period. For example, according to the information pertaining to the entry difficulty level shown in FIG. 5, for a facility identified as 100001, at 7:00 to 8:00 on a Monday the entry difficulty level is set to 3, at 8:00 to 9:00 on a Monday the entry difficulty level is set to 2, and at 9:00 to 10:00 on a Monday the entry difficulty level is set to 1.

The center map information database 26 is a storage unit that stores, for example, link data pertaining to roads (links), node data pertaining to node points, map display data for displaying a map, intersection data pertaining to intersections, search data for searching routes, facility data pertaining to facilities, and search data for searching a point.

Meanwhile, the center communication device 27 is a communication device for performing communication with the vehicle 3 via a network 8. In the present embodiment, the probe information and the information pertaining to the entry difficulty level of a facility are sent to and received from the vehicles 3 via the center communication device 27.

Figure 6:
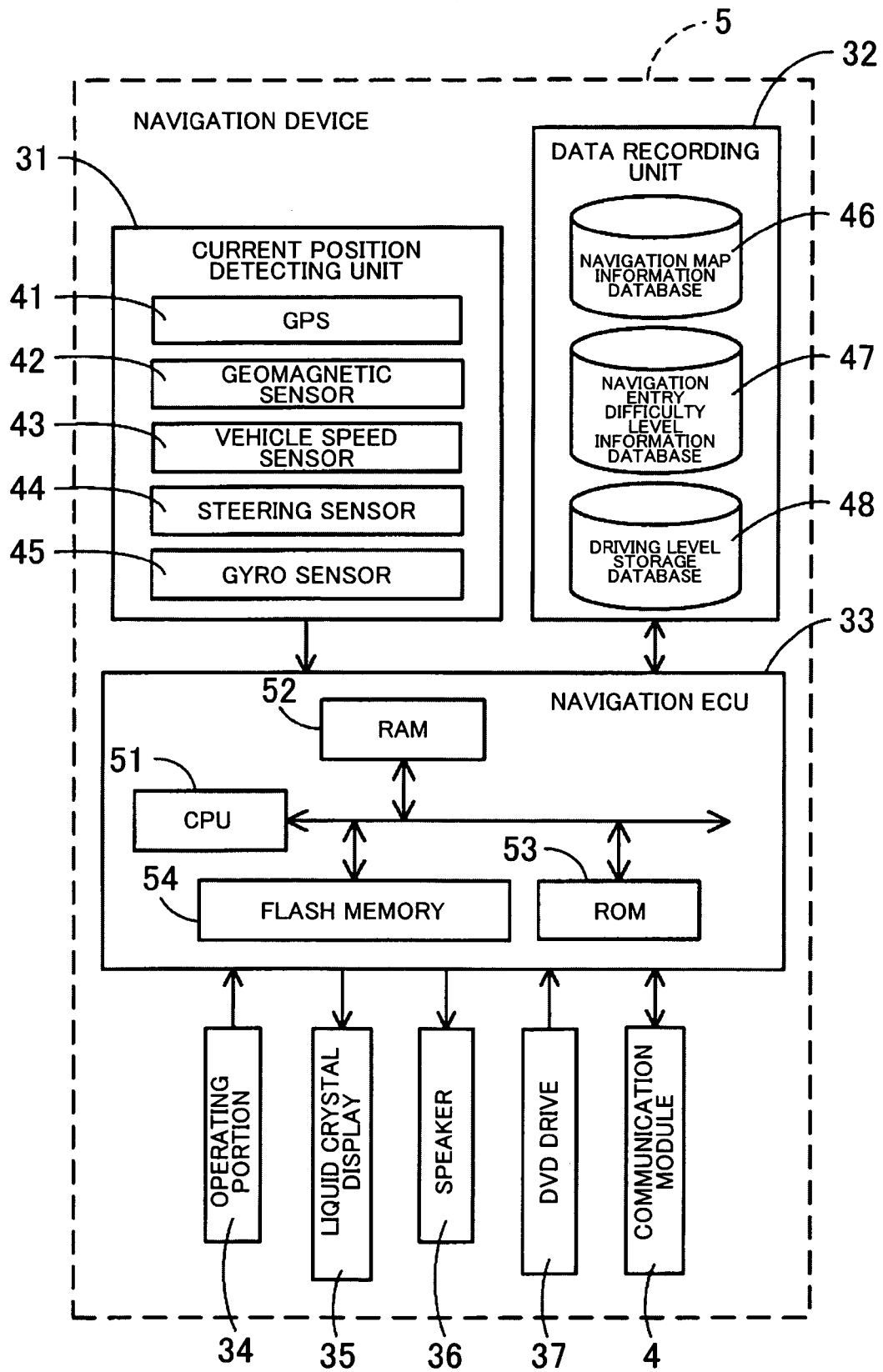
FIG. 6 is a block diagram schematically showing a control system of a navigation device according to the present embodiment.

A schematic configuration of the navigation device 5 mounted in the vehicle 3 will be explained next using FIG. 6. FIG. 6 is a block diagram schematically showing a control system of the navigation device 5 according to the present embodiment.

As FIG. 6 illustrates, the navigation device 5 according to the present embodiment is structured from the following: a current position detecting unit 31 that detects a current position of the host vehicle; a data recording unit 32 in which various data is recorded; a navigation ECU (a driving level identifying unit, a comparison unit, a travel guidance unit, a route search unit, an entry difficulty level obtaining unit, and an estimated arrival time calculating unit) 33 that performs various computational processing based upon input information; an operating portion 34 that accepts an operation from a user; a liquid crystal display 35 that shows information such as a map to the user; a speaker 36 that outputs voice guidance related to route guidance; a DVD drive 37 that reads out a DVD serving as a storage medium which stores a program; and the communication module 4 that enables communication with the probe center 2 and the VICS center.

Each of the configuring elements of the navigation device 5 will be explained in order below.

The current position detecting unit 31 includes the GPS 41, a geomagnetic sensor 42, a vehicle speed sensor 43, a steering sensor 44, a gyro sensor 45, and the like, and is capable of detecting the host vehicle's current position, heading and running speed, the current time, and the like. The vehicle speed sensor 43, in particular, is a sensor for detecting the vehicle's speed and distance traveled. The vehicle speed sensor 43 generates a pulse in response to the rotation of the vehicle's wheels and outputs a pulse signal to the navigation ECU 33. The navigation ECU 33 counts the generated pulses to compute the revolution speed of the wheels and the distance traveled. Note that it is not necessary for the navigation device 5 to be provided with all of the five types of sensors described above, and it is acceptable for the navigation device 5 to be provided with only one or a plurality among the five types of sensors.

The data recording unit 32 includes a hard disk (not shown) as an external storage device and a storage medium, as well as a recording head (not shown). The recording head serves as a driver for reading a navigation map information database 46, a navigation entry difficulty level information database 47, a driving level storage database 48, specified programs, and the like that are stored on the hard disk and for writing specified data to the hard disk.

The navigation map information database 46 here generally has the same structure as the center map information database 26 included in the probe center 2, and is a storage unit that stores, for example, link data pertaining to roads (links), node data pertaining to node points, map display data for displaying a map, intersection data pertaining to intersections, search data for searching routes, facility data pertaining to facilities, and search data for searching a point.

The navigation entry difficulty level information database 47 is a storage unit that stores information (see FIG. 5) pertaining to the entry difficulty level of a facility, as distributed from the probe center 2.

The driving level storage database 48 is a storage unit that stores a current driving level (defined using five levels ranging from 1 (easy) to 5 (hard)) of the host vehicle, which is determined based upon a travel history of the host vehicle. The method for determining the driving level of the host vehicle will be described in more detail later. Using the current driving level of a host vehicle stored in the driving level storage database 48 and information pertaining to the entry difficulty level of a facility stored in the navigation entry difficulty level information database 47, the navigation ECU 33 performs a route search, route guidance, and the like to a destination, as described later.

Meanwhile, the navigation ECU 33 is an electronic control unit that performs overall controls of the navigation device 5, including guidance route setting processing for setting a guidance route to a destination from the current position when a destination is selected, driving level identification processing for identifying the current driving level of the host vehicle, probe information sending processing for sending the entry direction when a vehicle entered a facility off the road on which the vehicle was traveling as probe information to the probe center 2, and driving support processing for performing driving support such as a route search based upon information pertaining to the entry difficulty level of the facility distributed from the probe center 2. Also provided are a CPU 51 serving as a computational device and a control device, as well as internal memory devices such as a RAM 52 that is used as a working memory when the CPU 51 performs various computational processing, and that also stores route data and the like when a route is searched; a ROM 53 in which a program for control is stored, in addition to a driving level identification processing program (see FIG. 7), and a driving support processing program (see FIG. 11), which are described later; and a flash memory 54 that records a program read out from the ROM 53.

Figure 7:
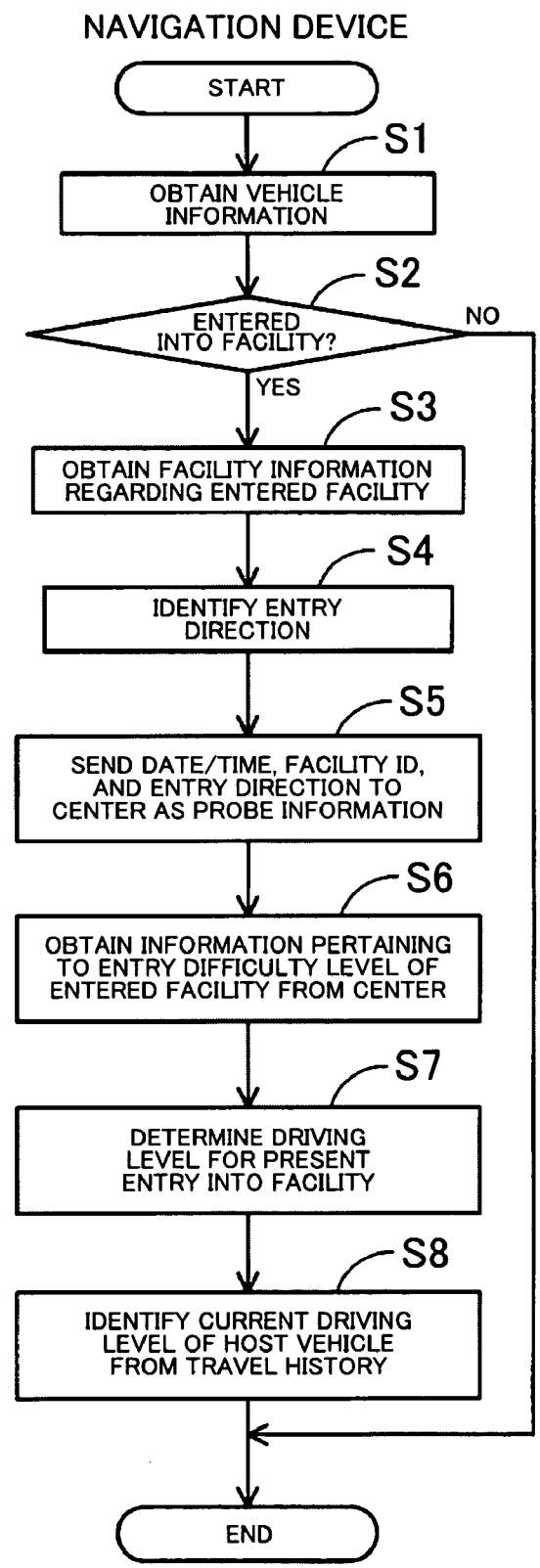
FIG. 7 is a flowchart of a driving level identification processing program according to the present embodiment.
Figure 11:
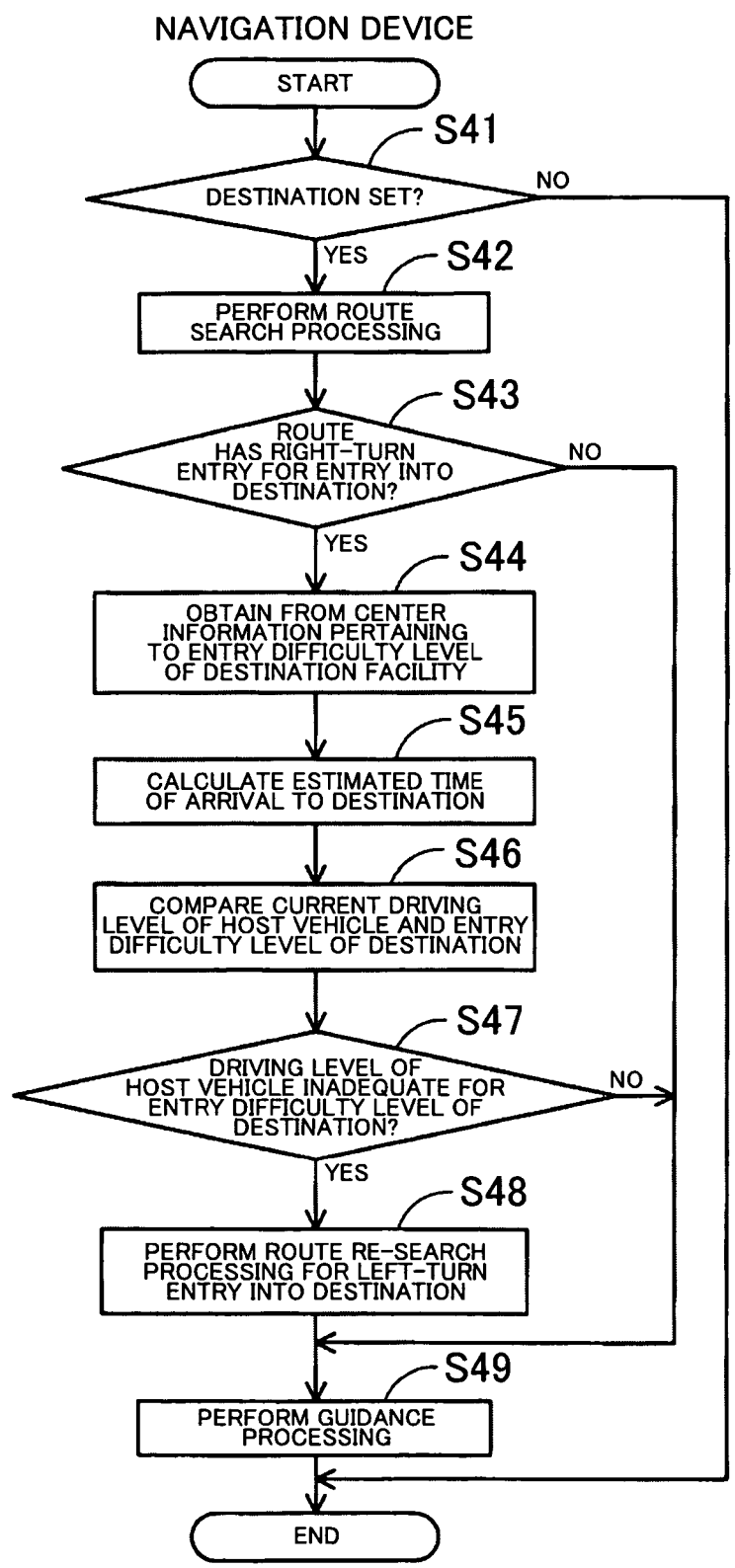
FIG. 11 is a flowchart of a driving support processing program according to the present embodiment.

Next, the driving level identification processing program executed in the navigation device 5 that structures the driving support system 1 having the configuration described above will be explained based upon FIG. 7. FIG. 7 is a flowchart of the driving level identification processing program according to the present embodiment. Here, the driving level identification processing program is repeatedly executed at a predetermined time interval (e.g. every 200 ms) once the ignition is turned on, and is a program that identifies the current driving level of the host vehicle and sends to the probe center 2 the probe information including the entry direction into a facility when the vehicle 3 entered the facility off the road on which the vehicle 3 was traveling. Note that the programs below shown in the flowcharts of FIGS. 7 and 11 are stored in the RAM 52, the ROM 53, or the like provided in the navigation ECU 33, and executed by the CPU 51.

In the probe information sending processing program, the CPU 51 first obtains vehicle information pertaining to the host vehicle at step (hereinafter abbreviated as "S") 1. Here, the vehicle information obtained at S1 is information pertaining to the host vehicle's current position, heading, vehicle speed, and steering angle. Note that the current position of the host vehicle is detected using the GPS 41. By executing map matching processing regarding the host vehicle's current position, the current position is identified on a map. The vehicle speed of the host vehicle is detected using the vehicle speed sensor 43. The heading of the host vehicle is detected using the geomagnetic sensor 42 and the gyro sensor 45. The steering angle of the host vehicle is detected using the steering sensor 44.

Next, at S2, the CPU 51 determines whether the host vehicle has entered a facility off a road on which the host vehicle was traveling, based upon the vehicle information obtained at S1. If it is determined that the host vehicle has entered the facility (YES at S2), then the routine proceeds to S3. Meanwhile, if it is determined that the host vehicle has not entered the facility (NO at S2), then the probe information sending processing program is ended.

At S3, the CPU 51 obtains facility information for the facility entered by the host vehicle. Specifically, the facility ID of the facility the host vehicle entered is obtained based on the host vehicle's current position and the navigation map information database 46. Note that position coordinates of the facility may be obtained instead of the facility ID.

At S4, the CPU 51 identifies the host vehicle's entry direction into the facility, based upon the vehicle information for a past predetermined period obtained at S1 and the navigation map information database 46. It should be noted that the entry direction is identified as any one of a right-turn entry, wherein the vehicle enters into the facility by making a right turn; a left-turn entry, wherein the vehicle enters into the facility by making a left turn; and a straight entry, wherein the vehicle enters into the facility by proceeding straight (see FIG. 14).

At S5, the CPU 51 sends the following as probe information to the probe center 2: the current date/time (date, day, and time); the vehicle ID identifying the vehicle; the facility ID of the facility entered by the host vehicle, which was obtained at S3; and the entry direction into the facility, which was obtained at S4.

At S6, the CPU 51 sends a distribution request to the probe center 2 to obtain information pertaining to the entry difficulty level of the facility entered by the host vehicle.

At S7, the CPU 51 determines the host vehicle's driving level regarding its present entry into the facility, based upon the host vehicle's entry direction into the facility as identified at S4 and the entry difficulty level of the facility entered by the host vehicle as obtained at S6. Note that the driving level of the host vehicle is defined using five levels ranging from 1 (low) to 5 (high) in the same manner as the entry difficulty level of the facility.

Specifically, if the host vehicle entered the facility by a right-turn entry, then the CPU 51 determines that the driving level of the host vehicle is the same value as the entry difficulty level of the facility. However, if the host vehicle entered the facility by a left-turn entry, then the driving level of the host vehicle regarding its present entry into the facility is not determined.

Next, at S8, the CPU 51 identifies the current driving level of the host vehicle based upon a travel history. Specifically, a comparison is made of the host vehicle's driving level regarding its present entry into the facility as first determined at S7 and the current driving level of the host vehicle stored in the driving level storage database 48. If the host vehicle's driving level as determined at S7 is larger than the current driving level of the host vehicle, then the current driving level of the host vehicle stored in the driving level storage database 48 is updated to the host vehicle's driving level as determined at S7. Meanwhile, if the host vehicle's driving level as determined at S7 is the same or smaller than the current driving level of the host vehicle, then the current driving level of the host vehicle is not updated. It should be noted that an initial value of the host vehicle's driving level is zero.

The current driving level of the host vehicle identified at S8 is used in driving support processing (FIG. 11) described later. Note that S8 is equivalent to processing by the driving level identifying unit.

Figure 8:
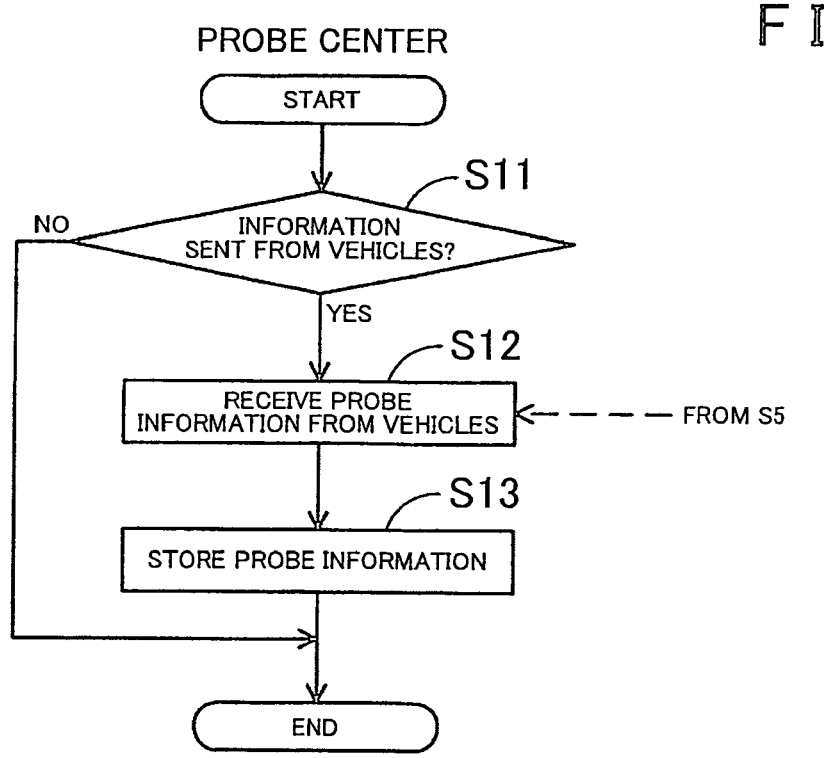
FIG. 8 is a flowchart of a probe information receiving processing program according to the present embodiment.
Figure 9:
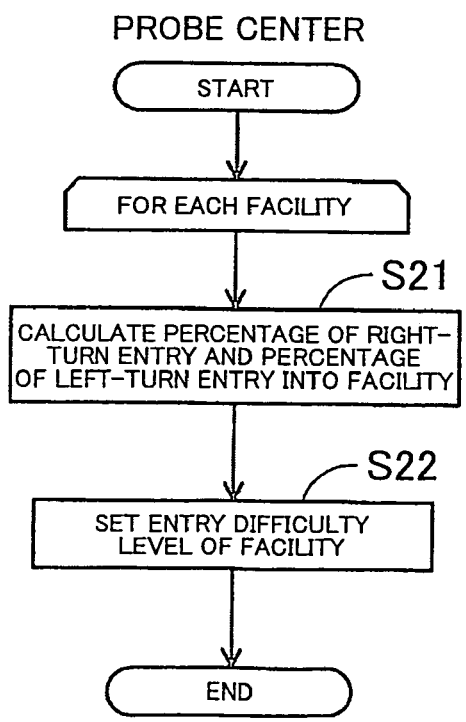
FIG. 9 is a flowchart of an entry difficulty level setting processing program according to the present embodiment.
Figure 10:
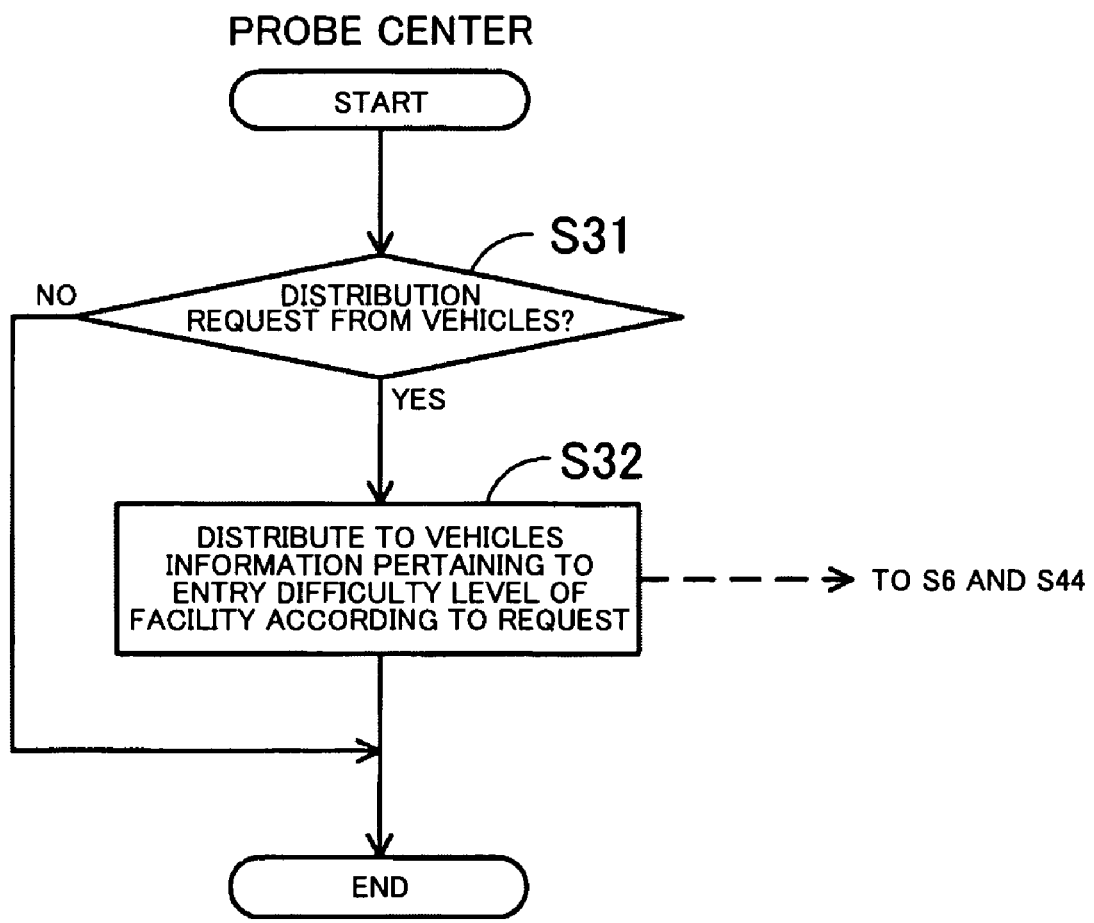
FIG. 10 is a flowchart of an information distribution processing program according to the present embodiment.

Next, the probe information receiving processing program executed in the probe center 2 that structures the driving support system 1 will be explained based upon FIG. 8. FIG. 8 is a flowchart of the probe information receiving processing program according to the present embodiment. Here, the probe information receiving processing program is executed at a predetermined time interval (e.g. every 200 ms), and is a program that receives the probe information sent from the vehicles 3. Note that the programs below shown in the flowcharts of FIGS. 8 to 10 are stored in the RAM 22, the ROM 23, and the like provided in the server 20, and executed by the CPU 21.

In the probe information receiving processing program, the CPU 21 first determines whether the probe information has been sent from the vehicles 3 traveling throughout the country at S11.

If it is determined that the probe information has been sent (YES at S11), then the sent probe information is received (S12). The CPU 21 then cumulatively stores the received probe information in the probe information database 24 (S13). Meanwhile, if it is determined that the probe information has not been sent (NO at S11), then the probe information receiving processing program is ended. Note that the probe information received at S12 includes a vehicle ID that identifies the vehicle from which the probe information was sent, a facility ID that identifies the facility into which the vehicle entered, a date/time at which the vehicle entered the facility, and an entry direction in which the vehicle entered the facility. Further note that S12 is equivalent to processing by the entry direction obtaining unit.

Next, the entry difficulty level setting processing program executed in the probe center 2 that structures the driving support system 1 will be explained based upon FIG. 9. FIG. 9 is a flowchart of the entry difficulty level setting processing program according to the present embodiment. Here, the entry difficulty level setting processing program is executed after a predetermined time (e.g. 1 month) has passed since the program was previously executed, and is a program that sets the entry difficulty level of facilities included in the map information based upon the probe information sent from the vehicles 3.

The processing at S21 to S22 below is executed in a loop in units of the facilities included in the map information stored in the center map information database 26, and is repeatedly performed until the processing is completed for all facilities included in the map information.

First, at S21, the CPU 21 extracts the probe information indicating entry into a facility targeted for processing for every day and time period the facility was entered from among the probe information stored in the probe information database 24, and calculates the right-turn entry percentage of the facility for every day and time period. Note that the right-turn entry percentage is a value indicating an approximate ratio of vehicles that entered by a right-turn entry among past vehicles that entered the facility which is the target of the processing. The right-turn entry percentage is calculated according to Formula (1) above. Further note that S21 is equivalent to processing by the percentage calculating unit.

Next, at S22, the CPU 21 sets the entry difficulty level of the facility targeted for processing for every day and time period, based upon the difficulty determination table (FIG. 4) stored in the ROM 23 and the right-turn entry percentage calculated at S21. In the present embodiment, the entry difficulty level is set to any one of five levels ranging from 1 (easy) to 5 (hard).

For example, referring to the difficulty determination table shown in FIG. 4, if the right-turn entry percentage calculated at S21 is 25%, then the entry difficulty level of the facility targeted for processing is determined as 3. Alternatively, if the right-turn entry percentage calculated at S21 is 9%, then the entry difficulty level of the facility targeted for processing is determined as 5.

The routine subsequently returns to S21 if there are unprocessed facilities remaining, and the processing at S21 to S22 is similarly performed. Meanwhile, if the processing at S21 to S22 has been completed for all the facilities included in the map information, then the entry difficulty level setting processing program is ended. Note that S22 is equivalent to processing by the entry difficulty level setting unit.

Next, the information distribution processing program executed in the probe center 2 that structures the driving support system 1 will be explained based upon FIG. 10. FIG. 10 is a flowchart of the information distribution processing program according to the present embodiment. Here, the information distribution program is executed at a predetermined time interval (e.g. every 200 ms), and is a program that distributes information pertaining to the entry difficulty level of facilities set by the entry difficulty level setting processing program (FIG. 9) to the vehicles 3.

In the information distribution processing program, the CPU 21 first determines whether there is a distribution request for information pertaining to the entry difficulty level of facilities from the vehicles 3 traveling throughout the country at S31.

If it is determined that there is a distribution request for information pertaining to the entry difficulty level of a facility (YES at S31), then the CPU 21 distributes the information pertaining to the entry difficulty level of the facility requested by the vehicle 3 to the requesting vehicle 3 (S32). Note that the navigation device 5 mounted in the vehicle 3 that received the information pertaining to the entry difficulty level of the facility identifies the driving level as described above based upon the received information pertaining to the entry difficulty level of the facility (S7 and S8), and performs driving support processing (FIG. 11) described later.

Meanwhile, if it is determined that there is no distribution request for information pertaining to the entry difficulty level of a facility (NO at S31), then the information distribution processing program is ended.

Next, the driving support processing program executed in the navigation device 5 that structures the driving support system 1 will be explained based upon FIG. 11. FIG. 11 is a flowchart of the driving support processing program according to the present embodiment. Here, the driving support processing program is executed at a predetermined time interval (e.g. every 200 ms) once the ignition is turned on, and is a program that performs driving support based upon information pertaining to the entry difficulty level of a facility obtained from the probe center 2.

In the driving support processing program, the CPU 51 first determines whether a destination has been set by the user at S41. If it is determined that a destination has been set (YES at S41), then route search processing is performed (S42). It should be noted that the route search processing is processing that searches for a route from a departure point (e.g. the host vehicle's current position) to the set destination using Dijkstra's algorithm. Specifically, the processing calculates a cost additional value of each route from the departure point to the destination to identify the route with the smallest cost additional value, and sets the identified route as the guidance route. Meanwhile, if it is determined that a destination has not been set (NO at S41), then the driving support processing is ended.

Next, at S43, the CPU 51 refers to the guidance route set at S42 and determines whether the entry into the destination facility specified in the guidance route is a right-turn entry. If it is consequently determined that the route specifies a right-turn entry for the entry into the destination facility (YES at S43), then the routine proceeds to S44. Meanwhile, if it is determined that the route specifies a left-turn entry or a straight entry for the entry into the destination facility (NO at S43), then no modification is made to the guidance route set at S42 and driving guidance is initiated based upon the guidance route (S49).

At S44, the CPU 51 sends a distribution request to the probe center 2 to obtain information pertaining to the entry difficulty level of the set destination facility. Note that S44 is equivalent to processing by the entry difficulty level obtaining unit.

At S45, the CPU 51 obtains a link average travel time for each link included in the guidance route from the navigation map information database 46, and calculates an estimated time of arrival to the destination when traveling along the guidance route. Note that S45 is equivalent to processing by the estimated arrival time calculating unit.

Next, at S46, the CPU 51 first extracts the entry difficulty level of the destination at the estimated time of arrival from among the entry difficulty levels of the destination obtained at S44. A comparison is then made of the current driving level of the host vehicle identified at S8, and the entry difficulty level of the destination at the estimated time of arrival. Note that if the entry difficulty level of the destination at the estimated time of arrival cannot be obtained from the probe center 2, then the routine skips the subsequent processing at S46 to S48 and proceeds instead to S49. Further note that S46 is equivalent to processing by the comparison unit.

At S47, the CPU 51 then determines whether the current driving level of the host vehicle is inadequate for the entry difficulty level of the destination, based upon a comparison result at S46. Note that the driving level of the host vehicle and the entry difficulty level of the facility are both defined using five levels ranging from 1 to 5 as explained above. If the value of the driving level of the host vehicle is smaller than the value of the entry difficulty level of the facility, then it is determined that the current driving level of the host vehicle is inadequate for the entry difficulty level of the destination at the estimated time of arrival. However, if the value of the driving level of the host vehicle is equal to or larger than the value of the entry difficulty level of the facility, then it is determined that the current driving level of the host vehicle is adequate for the entry difficulty level of the destination at the estimated time of arrival.

If it is determined that the current driving level of the host vehicle is inadequate for the entry difficulty level of the destination at the estimated time of arrival as a result of the determination at S47 (YES at S47), then the routine proceeds to S48. Meanwhile, if it is determined that the current driving level of the host vehicle is adequate for the entry difficulty level of the destination at the estimated time of arrival (NO at S47), then no modification is made to the guidance route set at S42 and driving guidance is initiated based upon the guidance route (S49).

At S48, the CPU 51 discards the guidance route set at S42 and performs a route search again in order to set a guidance route specifying a left-turn entry as the entry direction into the destination.

Figure 12:
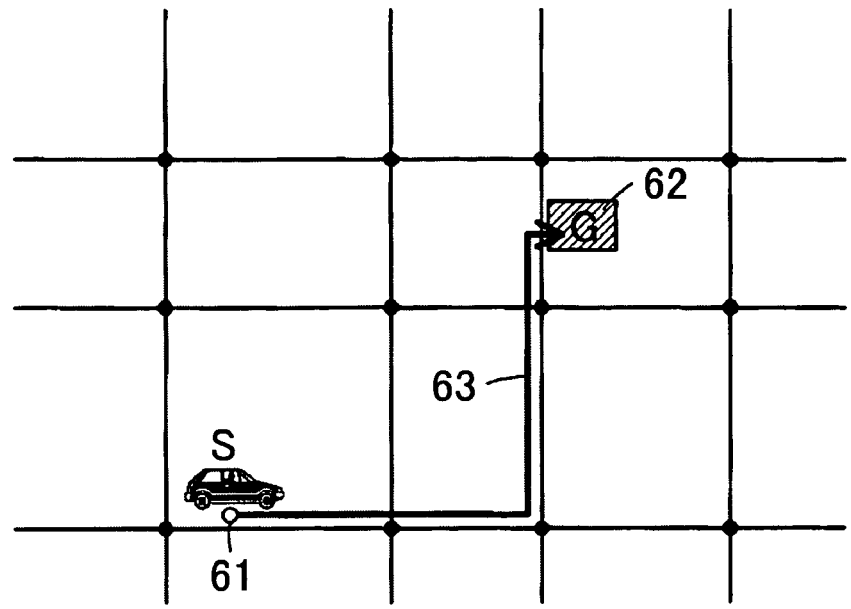
FIG. 12 is a drawing that shows an example of a guidance route before repeating a route search.

Route re-search processing at S48 will be explained below using FIGS. 12 and 13. Here, FIG. 12 is a drawing that shows a guidance route 63 set as a result of an ordinary route search performed from a departure point 61 to a destination 62 at S42. As shown in FIG. 12, performing the route search from the departure point 61 to the destination 62 using an ordinary cost calculation results in the set guidance route 63 as the shortest route to the destination in terms of time and distance. However, the guidance route 63 also specifies a right-turn entry into the destination.

Figure 13:
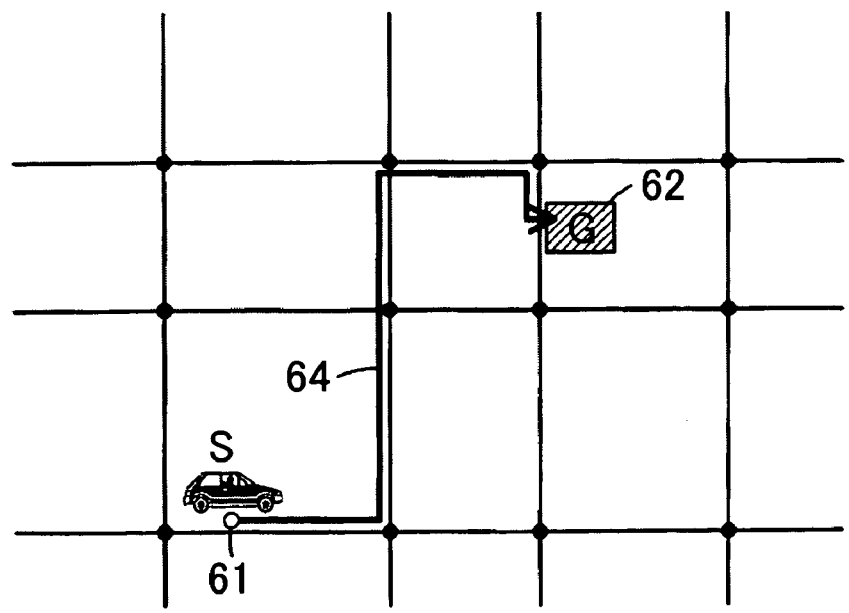
FIG. 13 is a drawing that shows an example of a guidance route after repeating a route search.

Meanwhile, FIG. 13 is a drawing that shows a guidance route 64 newly set as a result of a route search performed again from the departure point 61 to the destination 62 at S48. As shown in FIG. 13, when a search is performed for a route wherein a left-turn entry is specified as the entry direction into the destination in addition to the ordinary cost calculation for a route search from the departure point 61 to the destination 62, the set guidance route 64 may not be the shortest route to the destination in terms of time and distance, but it is a route that specifies a left-turn entry into the destination.

Therefore, setting the guidance route 63 shown in FIG. 12 for a vehicle with a high driving level makes it possible for the vehicle to arrive at the destination via the shortest route in terms of time and distance. Meanwhile, setting the guidance route 64 shown in FIG. 13 for a vehicle with a low driving level makes it possible for the vehicle to arrive at the destination via the route with an easy entry into the destination. Note that S48 is equivalent to processing by the route search unit.

Subsequent at S49, the CPU 51 initiates guidance processing that guides the travel of the driver based upon the guidance route set at S42 or the guidance route set at S48. Note that S49 is equivalent to processing by the travel guidance unit.

As described above, in the driving support system 1 according to the present invention, the driving support method used by the driving support system 1, and the computer program executed by the driving support system 1, when a vehicle enters into a facility off a road on which the vehicle was traveling, information pertaining to the entry direction into the facility is sent to the probe center 2 as probe information (S5), and the current driving level of the host vehicle is identified (S7 and S8). Meanwhile, the probe center 2 that received the probe information calculates a right-turn entry percentage for facilities based upon the received probe information (S21), and sets the entry difficulty level of facilities based upon the calculated right-turn entry percentage (S22). The vehicle 3 to which information pertaining to the entry difficulty level of the set facility was distributed from the probe center 2 performs driving support based upon the information pertaining to the entry difficulty level of the facility (S48 and S49). Therefore, the entry difficulty level of the facility can be set based upon the result of an actual vehicle entering into the facility, which consequently enables accurate setting of the entry difficulty level of the facility.

Since the entry difficulty level of the facility is set per date/time, the entry difficulty level of the facility can be set in consideration of a change in traffic volume on a road adjacent to the facility, and the like. Therefore, the entry difficulty level of the facility can be more accurately set in accordance with the day and time period.

A higher entry difficulty level is set for a facility where there is a smaller percentage of right-turn entry. Therefore, the entry difficulty level of the facility can be accurately set based upon the results of actual vehicles entering into the facility.

However, if the destination has been set, the driving level of the vehicle is compared with the entry level of the destination (S46). If it is determined that the driving level is inadequate compared to the entry difficulty level of the destination, then a route specifying a left-turn entry into the destination is searched (S48). Therefore, driving support can be achieved in line with the driving level of the vehicle. In other words, it is possible for a vehicle with a low driving level to arrive at the destination via a route with an easy entry into the destination.

Since the entry difficulty level of the facility is set per date/time, an entry difficulty level for the destination can be obtained in consideration of a change in traffic volume on a road adjacent to the destination. Therefore, appropriate driving support can be performed based upon an accurate entry difficulty level for the destination.

It should be understood by those skilled in the art that the present invention is not limited by the embodiment described above and that various improvements and modifications may occur insofar as they are within the scope of the present invention.

In the above embodiment, driving support based upon a set entry difficulty level for a facility is performed, wherein if the driving level of the vehicle is inadequate for the entry difficulty level of the facility, a search is performed again to find a route with a left-turn entry. However, other driving support may also be performed. For example, if the driving level of the vehicle is inadequate for the entry difficulty level of the destination, then guidance such as "caution: a right turn is required to enter the destination" may be displayed on the liquid crystal display 35 when approaching the destination, or voice guidance may be output from the speaker 36.

What is claimed is:

1. A driving support system, comprising:
   an entry direction obtaining unit that obtains an entry direction when respective vehicles traveling on a road enter a facility, the entry direction indicating a cross-traffic entry or an entry other than a cross-traffic entry;
   a percentage calculating unit that calculates a percentage of cross-traffic entry of the facility based upon the entry directions obtained by the entry direction obtaining unit, the percentage of cross-traffic entry being a percentage of vehicles that entered the facility by a cross-traffic entry among vehicles that entered the facility;
   an entry difficulty level setting unit that sets an entry difficulty level for the facility based upon the percentage of cross-traffic entry calculated by the percentage calculating unit; and
   a travel guidance unit that performs guidance regarding travel of a vehicle based upon the entry difficulty level.

2. The driving support system according to claim 1, wherein
   the percentage calculating unit calculates the percentage of cross-traffic entry per date and time, and
   the entry difficulty level setting unit sets the entry difficulty level of the facility per date and time.

3. The driving support system according to claim 1, wherein
   the entry difficulty level setting unit sets a higher entry difficulty level for a facility where there is a smaller percentage of cross-traffic entry.

4. The driving support system according to claim 2, wherein
   the entry difficulty level setting unit sets a higher entry difficulty level for a facility where there is a smaller percentage of cross-traffic entry.

5. The driving support system according to claim 1, further comprising:
   a driving level identifying unit that identifies a driving level of the vehicle from a travel history of the vehicle; and
   a comparison unit that compares the entry difficulty level and the driving level,
   wherein the travel guidance unit performs the guidance regarding travel of the vehicle based upon a comparison result of the comparison unit.

6. The driving support system according to claim 2, further comprising:
   a driving level identifying unit that identifies a driving level of the vehicle from a travel history of the vehicle; and
   a comparison unit that compares the entry difficulty level and the driving level, wherein the travel guidance unit performs the guidance regarding travel of the vehicle based upon a comparison result of the comparison unit.

7. The driving support system according to claim 3, further comprising:

a driving level identifying unit that identifies a driving level of the vehicle from a travel history of the vehicle; and a comparison unit that compares the entry difficulty level and the driving level, wherein the travel guidance unit performs the guidance regarding travel of the vehicle based upon a comparison result of the comparison unit.

8. The driving support system according to claim 4, further comprising:

a driving level identifying unit that identifies a driving level of the vehicle from a travel history of the vehicle; and a comparison unit that compares the entry difficulty level and the driving level, wherein the travel guidance unit performs the guidance regarding travel of the vehicle based upon a comparison result of the comparison unit.

9. The driving support system according to claim 5, further comprising:

a route search unit that searches for a route to a destination, wherein the comparison unit includes an entry difficulty level obtaining unit that obtains an entry difficulty level for a facility that is the destination from among the entry difficulty levels of facilities set by the entry difficulty level setting unit, and compares the entry difficulty level of the destination obtained by the entry difficulty level obtaining unit with the driving level, and the route search unit searches for a route specifying a non-cross-traffic entry into the destination when it is determined that the driving level is inadequate compared to the entry difficulty level of the destination.

10. The driving support system according to claim 9, further comprising:

an estimated arrival time calculating unit that calculates an estimated time of arrival at which the vehicle will arrive at the destination, wherein the percentage calculating unit calculates the percentage of cross-traffic entry per date and time, the entry difficulty level setting unit sets the entry difficulty level of the facility per date and time, and the entry difficulty level obtaining unit obtains the entry difficulty level of the destination at the estimated time of arrival at the destination.

11. The driving support system according to claim 6, further comprising:

a route search unit that searches for a route to a destination, wherein the comparison unit includes an entry difficulty level obtaining unit that obtains an entry difficulty level for a facility that is the destination from among the entry difficulty levels of facilities set by the entry difficulty level setting unit, and compares the entry difficulty level of the destination obtained by the entry difficulty level obtaining unit with the driving level, and the route search unit searches for a route specifying a non-cross-traffic entry into the destination when it is determined that the driving level is inadequate compared to the entry difficulty level of the destination.

12. The driving support system according to claim 11, further comprising:

an estimated arrival time calculating unit that calculates an estimated time of arrival at which the vehicle will arrive at the destination, wherein the percentage calculating unit calculates the percentage of cross-traffic entry per date and time, and the entry difficulty level setting unit sets the entry difficulty level of the facility per date and time, and the entry difficulty level obtaining unit obtains the entry difficulty level of the destination at the estimated time of arrival at the destination.

13. The driving support system according to claim 7, further comprising:

a route search unit that searches for a route to a destination, wherein the comparison unit includes an entry difficulty level obtaining unit that obtains an entry difficulty level for a facility that is the destination from among the entry difficulty levels of facilities set by the entry difficulty level setting unit, and compares the entry difficulty level of the destination obtained by the entry difficulty level obtaining unit with the driving level, and the route search unit searches for a route specifying a non-cross-traffic entry into the destination when it is determined that the driving level is inadequate compared to the entry difficulty level of the destination.

14. The driving support system according to claim 13, further comprising:

an estimated arrival time calculating unit that calculates an estimated time of arrival at which the vehicle will arrive at the destination, wherein the percentage calculating unit calculates the percentage of cross-traffic entry per date and time, and the entry difficulty level setting unit sets the entry difficulty level of the facility per date and time, and the entry difficulty level obtaining unit obtains the entry difficulty level of the destination at the estimated time of arrival at the destination.

15. The driving support system according to claim 8, further comprising:

a route search unit that searches for a route to a destination, wherein the comparison unit includes an entry difficulty level obtaining unit that obtains an entry difficulty level for a facility that is the destination from among the entry difficulty levels of facilities set by the entry difficulty level setting unit, and compares the entry difficulty level of the destination obtained by the entry difficulty level obtaining unit with the driving level, and the route search unit searches for a route specifying a non-cross-traffic entry into the destination when it is determined that the driving level is inadequate compared to the entry difficulty level of the destination.

16. The driving support system according to claim 15, further comprising:

an estimated arrival time calculating unit that calculates an estimated time of arrival at which the vehicle will arrive at the destination, wherein the percentage calculating unit calculates the percentage of cross-traffic entry per date and time, and the entry difficulty level setting unit sets the entry difficulty level of the facility per date and time, and the entry difficulty level obtaining unit obtains the entry difficulty level of the destination at the estimated time of arrival at the destination.

17. A driving support method, comprising the steps of:

obtaining an entry direction when respective vehicles traveling on a road enter a facility, the entry direction indicating a cross-traffic entry or an entry other than a cross-traffic entry;

calculating a percentage of cross-traffic entry of the facility based upon the entry directions obtained at the entry direction obtaining step, the percentage of cross-traffic entry being a percentage of vehicles that entered the facility by a cross-traffic entry among vehicles that entered the facility;

setting an entry difficulty level for the facility based upon the percentage of cross-traffic entry calculated at the percentage calculating step; and performing a travel guidance based upon the entry difficult level.

18. A computer program, stored on a non-transitory computer readable medium that, when executed by a computer, performs the functions of:

obtaining an entry direction when respective vehicles traveling on a road enter a facility, the entry direction indicating a cross-traffic entry or an entry other than a cross-traffic entry;

calculating a percentage of cross-traffic entry of the facility based upon the entry directions obtained by the entry direction obtaining function, the percentage of cross-traffic entry being a percentage of vehicles that entered the facility by a cross-traffic entry among vehicles that entered the facility;

setting an entry difficulty level for the facility based upon the percentage of cross-traffic entry calculated by the percentage calculating function; and performing a travel guidance based upon the entry difficult level.

* * * * *